United States Patent

[11] 3,601,311

| [72] | Inventor | Soichiro Honda<br>Tokyo, Japan |
|---|---|---|
| [21] | Appl. No. | 865,000 |
| [22] | Filed | Oct. 9, 1969 |
| [45] | Patented | Aug. 24, 1971 |
| [73] | Assignee | Honda Giken Kogyo Kabushiki Kaisha<br>Tokyo, Japan |
| [32] | Priority | Oct. 9, 1968, Oct. 12, 1968 |
| [33] | | Japan |
| [31] | | 43/73,144 and 43/74,511 |

[54] ENGINE COOLING AND PASSENGER COMPARTMENT HEATING APPARATUS
3 Claims, 2 Drawing Figs.

| [52] | U.S. Cl. | 237/12.3 A |
|---|---|---|
| [51] | Int. Cl. | B60h 1/16 |
| [50] | Field of Search | 237/12.3, 12.4; 123/41.67, 41.70 |

[56] References Cited
UNITED STATES PATENTS

| 1,755,924 | 4/1930 | Keagle | 237/12.3 A X |
| 2,078,499 | 4/1937 | Lungstrom | 123/41.67 UX |
| 2,155,278 | 4/1939 | Mautsch | 237/12.4 |

FOREIGN PATENTS

| 829,118 | 2/1960 | Great Britain | 123/41.67 |

*Primary Examiner*—Edward J. Michael
*Attorney*—Waters, Roditi, Schwartz & Nissen ABSTRACT: An engine of a motor vehicle has a passage for the flow of fresh cooling air in heat exchange relation with the engine, the passage being closed and isolated from a joint between the engine block and the cylinder head to preclude entry into the passage of gases leaking past the joint. The passage leads to a passenger compartment of the vehicle for heating the interior thereof.

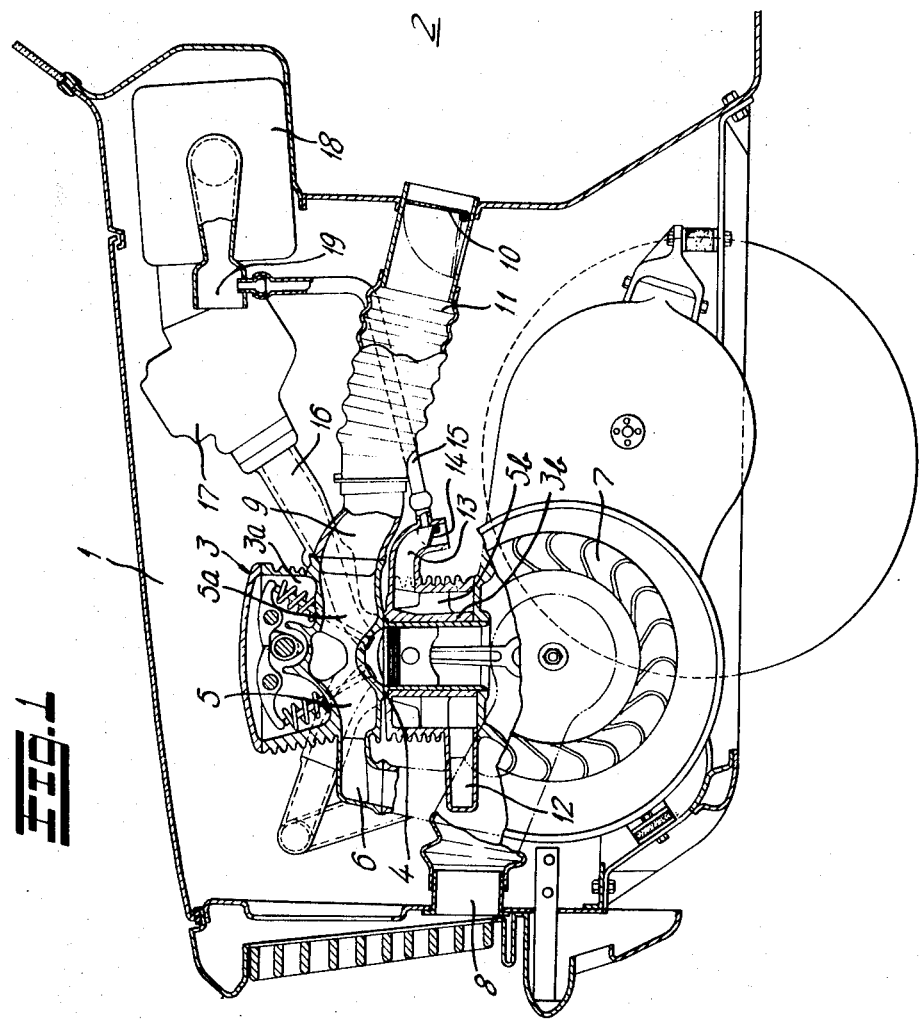

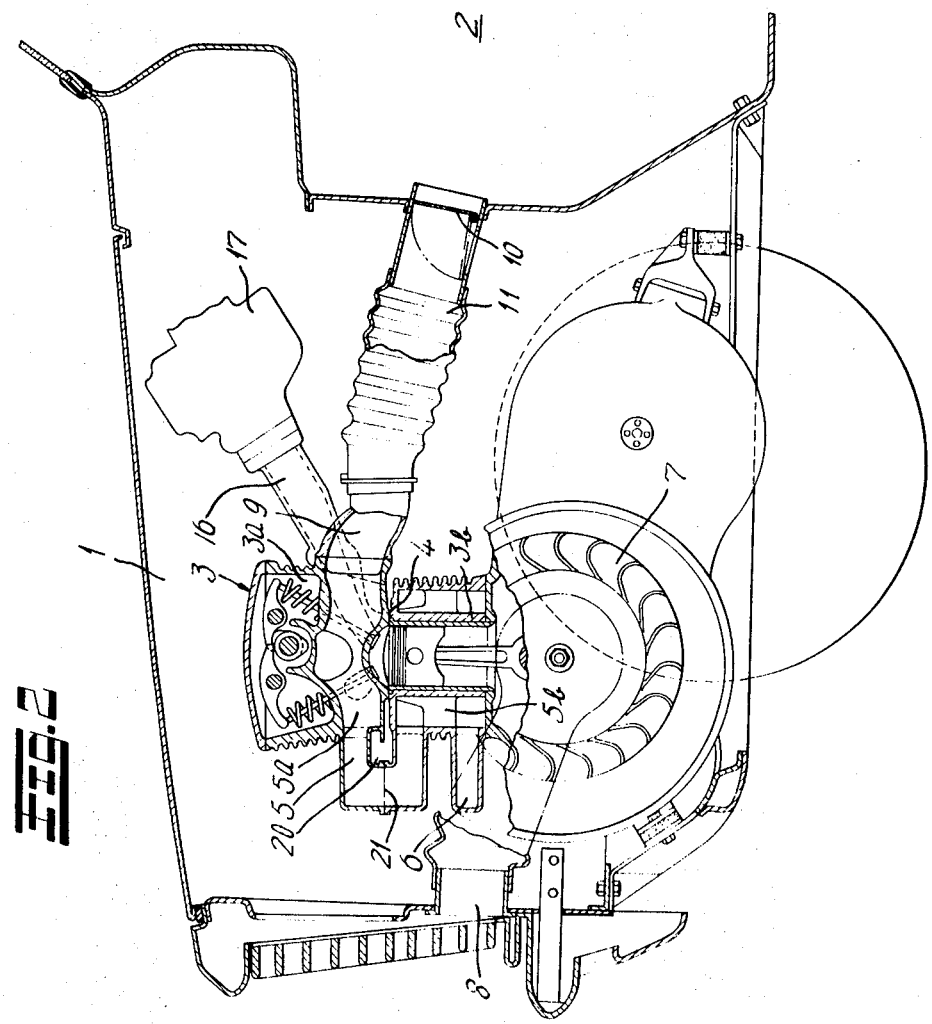

ENGINE COOLING AND PASSENGER COMPARTMENT HEATING APPARATUS

BRIEF SUMMARY OF THE INVENTION

This invention relates to apparatus of the type in which an internal combustion engine of a motor vehicle is forcibly cooled by cooling air and this cooling air is then led into a passenger compartment for being utilized for heating thereof.

It is desirable in this type of apparatus to prevent, on the occasion of leakage or blowoff of internal gas within the engine at a joint surface between a cylinder head portion and a cylinder main body portion of the engine, this gas from entering the passenger compartment along with the cooling air.

An object of this invention is to provide an apparatus fulfilling this requirement, and the invention is characterized in that, a passage for forced cooling air surrounds the engine so as to be in communication at one end with an inlet for fresh air and at its other end with an outlet leading into the interior of the passenger compartment, said passage being constructed so as to be isolated from a joint surface between a cylinder head portion and a cylinder main body portion of the engine. The cooling air passage may comprise only an upper passage surrounding the engine cylinder head portion, or only a lower passage surrounding the engine cylinder main body portion, or both of these upper and lower passages connected in series or in parallel one with another. In these cases, the upper and lower passages are offset above and below, respectively, the engine joint surface so as not to include said surface. Accordingly, when blowoff of the internal gas arises at the joint surface, this gas never can be led into the passenger compartment through this passage.

In the case when the upper and lower passages are connected in parallel one with another, either one can be used for heating of the passenger compartment and the other for supply of heated air to the combustion air supplied to the engine under suction. Thus the latter one of these passages is connected at its outlet opening to an engine suction air passage, instead of the passenger compartment for heating of the suction air.

In the case when the upper and lower passages are connected in series with one another, these two passages are connected together at a joint which is laterally offset from the engine joint surface so as to be isolated from said surface. Accordingly, it can be prevented that, when the blowoff of the internal gas arises at the joint surface, said gas is led into the passenger compartment.

BRIEF DESCRIPTION OF THE DRAWING

FIG. 1 is a side view, partly in section, of one embodiment of this invention; and FIG. 2 is a side view, partly in section, of another embodiment of this invention.

DETAILED DESCRIPTION

Numeral 1 denotes an engine compartment at the front portion of a motorcar, numeral 2 denotes a passenger compartment behind the engine compartment 1, and numeral 3 denotes an internal combustion engine positioned within the engine compartment 1. Engine 3 comprises in a substantially conventional arrangement, an upper cylinder head portion 3a and a lower cylinder main body portion 3b joined at a common joint surface 4.

A passage 5 for the forced flow of cooling air surrounds the engine 3, and the passage 5 is in communication at its inlet opening 6 with a blower 7 driven by the engine 3. The blower 7 is connected with an external air intake opening 8 made in a front wall of the engine compartment 1. The passage 5 has an outlet end opening 9 connected to a conduit pipe 11 having a valve 10 therein for controlling supply of air to the interior of the passenger compartment 2. By the operation of the blower 7, external air is forced to pass through the passage 5 to forcibly cool the engine 3, and the resultant heated air is then led into the passenger compartment 2 for being utilized for heating purposes therein.

The passage 5 may comprise only an upper passage 5a surrounding the engine cylinder head portion 3a, or only a lower passage 5b surrounding the engine cylinder main body portion 3b or both of these two passages 5a and 5b arranged in parallel or in series one with another. In these cases, the upper and lower passages 5a and 5b are constructed to be positioned above and below, respectively, the joint surface 4 so as not to include said surface 4. Accordingly, even if leakage or blowoff of internal gases arises at the joint surface 4, this gas will never be conveyed into the passenger compartment 2 through the passage 5.

In the embodiment of FIG. 1, the passage 5 comprises only the upper passage 5a. Namely, this passage 5a is in communication at its inlet opening 6 with the blower 7 and at its outlet opening 9 with the interior of the passenger compartment 2, as mentioned before, so that by the operation of the blower 7 the external air is forcibly led into the passage 5a for cooling the engine cylinder head portion 3a, and the resultant hot air is then led into the passenger compartment 2 for heating the same. In this case, the passage 5a is offset upwardly from the joint surface 4 so as not to include the same. Accordingly, even if leakage of the internal gases occurs at the joint surface 4, these gases will never be led into the passenger compartment 2 and compartment 2 can be kept free thereof.

The embodiment of FIG. 1 also shows the lower passage 5b as well. This lower passage 5b, however, is not in communication with the passenger compartment 2 and therefore is not used for heating this compartment. Passage 5b is in communication at its inlet opening 12 with the foregoing air flower 7 in parallel with the upper passage 5a, so that the passage 5b can be supplied, independently of the upper passage 5a, with the cooling air, to cool the engine main body portion 3b. The passage 5b is connected at its outlet opening 13 to a conduit 15 having a valve 10, said conduit 15 being connected to a suction air passage 16 of the engine 3, for example, an intake opening 19 of an air cleaner 18 connected to a carburetor 17. Thus the passage 5b can serve to heat the engine suction air for preventing such difficulties as icing of the carburetor 17 and the like.

This lower passage 5b is constructed separately from the foregoing upper passage 5a. Accordingly, even if, for example, backfire arises in the engine 3 and the exhaust gas flows backward through the suction passage 16 and enters the passage 5b, this gas can never be led into the passenger compartment 2 through the passage 5a.

In the embodiment of FIG. 2, the passage 5 comprises the upper passage 5a and the lower passage 5b connected in series with one another, and this passage 5 is connected at its inlet opening 6 to the external air intake opening 8 through the blower 7 and at its outlet opening 9 to the interior of the passenger compartment 2, so that by the operation of the blower 7 the external air is forced into the passage 5 for cooling the two cylinder portions 3a and 3b of the engine 3 and the resultant hot air is then led into the passenger compartment 2 for heating purposes. The connection of the two passages 5a and 5b is made at a connecting portion 21 offset laterally from the joint surface 4 with a space 20 formed therebetween, so that even if leakage or blowoff of the internal gases rises at the joint surface 4 this gas can never be led into the passenger compartment 2.

Thus, in this invention apparatus, the air having forcibly cooled the engine is then led into the passenger compartment for being utilized for heating purposes, but in this case even if blowoff of the internal gas arises at the engine joint surface, this gas never can be led into the passenger compartment and thus the interior thereof can remain clear of such gas. Additionally, the air after having cooled the engine, can be controllably utilized also for heating of the engine suction air and thereby icing of the carburetor can be effectively prevented.

What is claimed is:

1. Engine cooling and passenger compartment heating apparatus for a vehicle having, in an engine compartment, an engine with a cylinder head portion and a cylinder main body portion joined along a joint surface, said apparatus comprising means defining a cooling air passage in heat exchange relationship with the engine and in isolation with said joint surface so as to be separated therefrom, said passage including first and second portions respectively surrounding the cylinder head portion and the main body portion and offset above and below said joint surface, single blower means connected to said first and second passage portions for supplying air thereto and for urging cooling air through said air passage, and means connecting said passage with the passenger compartment for the flow of air thereinto after the air has cooled the engine and become heated in response to said heat exchange relationship.

2. Apparatus as claimed in claim 1 wherein said first and second passage portions include respective inlets connected in parallel with one another to a source of external air, one of said first and second portions being connected to said passenger compartment connecting means, and means connecting the other of said first and second passage portions to an engine suction passage for supplying heated air thereto.

3. Apparatus as claimed in claim 1 including valve means interposed in said passenger compartment connecting means for controlling the flow of heated air to said compartment from said air passage.